Feb. 14, 1961 — C. A. ASHBAKER — 2,972,042
SUBMERGED ARC WELDING APPARATUS
Filed April 9, 1959

Inventor
Charles A. Ashbaker
Attorney

United States Patent Office 2,972,042
Patented Feb. 14, 1961

2,972,042
SUBMERGED ARC WELDING APPARATUS
Charles A. Ashbaker, Springfield, Ill., assignor to Allis-Chalmers Manufacturing Company, Milwaukee, Wis.

Filed Apr. 9, 1959, Ser. No. 805,176

8 Claims. (Cl. 219—126)

This invention relates generally to submerged arc welding apparatus and is more particularly concerned with an improved flux dam assembly for a submerged arc welding machine.

Conventional submerged arc welding machines are equipped with some means of continuously supplying granular flux to the area surrounding the welding electrode in order to cover or submerge the fusion zone during the welding operation. Heretofore belt type flux dam assemblies have been widely used on submerged arc welding machines to prevent flux from spilling or sifting over the outer edge of the work piece being welded.

The belt type flux dam assembly is rather complex and usually includes an endless belt which is mounted on rollers and abuts against the work piece next to the fusion zone. The belt is composed of a so-called heat resistant material, such as reinforced asbestos fiber, and is intended to revolve as it follows the contour of the work piece as the welding electrode is moved along the seam of the weld. Very frequently, however, the belt fails to rotate causing a stationary portion of the belt to be subjected to the high temperature of the fusion zone for a prolonged period of time. This stationary portion is actually burned which seriously weakens the belt causing it to break. In some instances the belt will burn and break shortly after being put into service.

When a belt breaks, the welding operation must be halted until a new belt can be installed. Frequent halting of the welding operation to replace the belt in addition to the cost of the new belt substantially increases the manufacturing cost of the item being welded and is obviously undesirable.

It is, therefore, an object of this invention to provide an improved flux dam assembly which will overcome the disadvantages hereinbefore pointed out in an entirely satisfactory manner.

It is another object of the present invention to provide an improved flux dam assembly which will follow the contours of the work piece and prevent flux from spilling over the edge.

It is a further object of the present invention to provide a flux dam assembly which will be manually adjustable into and out of contact with the work piece, will follow the contour of the work piece, will prevent flux from spilling over the edge of the work piece, and additionally will not be subject to burning.

These and other objects and advantages will become apparent to those skilled in the art when the following description is read in conjunction with the attached drawings in which.

Figures 1, 2, 3, 4:
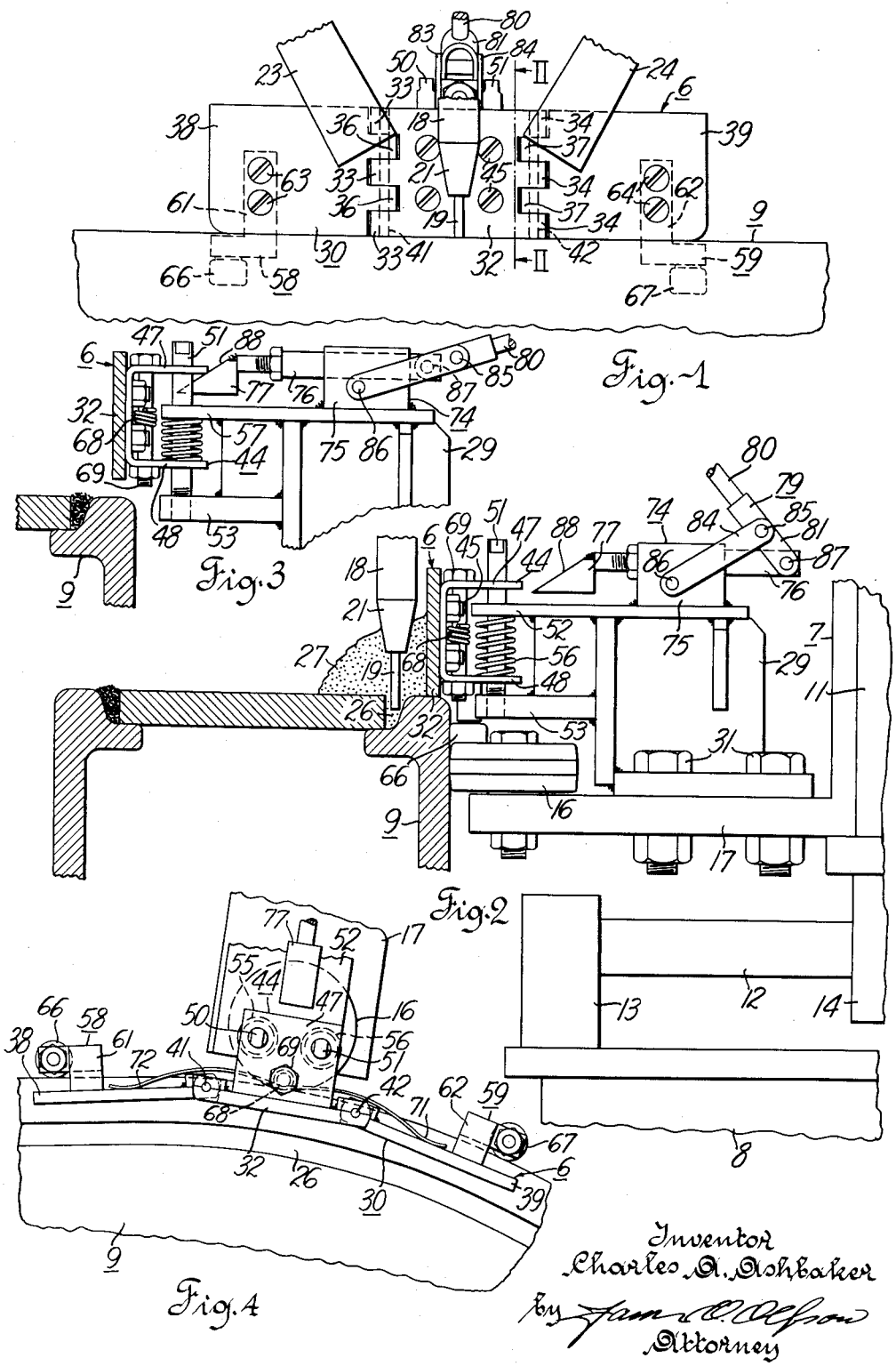
Fig. 1 is a front view of the flux dam assembly positioned on a work piece in relation to the portion of the welding head which supports the welding electrode and also in relation to a pair of flux spouts, only portions of the latter being shown.
Fig. 2 is a side view of a portion of the submerged arc welding machine in position to perform a welding operation on a work piece, the flux dam assembly being shown in section as taken along lines II—II in Fig. 1.
Fig. 3 shows the flux dam of Fig. 2 in the raised position out of contact with the work piece.
Fig. 4 is a top view of the flux dam assembly as it follows the contour of the work piece during a welding cycle.

Referring to Figs. 1, 2 and 4, the flux dam assembly, indicated generally by the reference numeral 6, is illustrated in combination with a known type of submerged arc welding machine, a portion of the latter being shown and identified by reference numeral 7. Welding machine 7 includes a main carriage 8 which is mounted on a suitable track, not shown, for movement with respect to a stationary work piece, the latter being indicated generally by reference numeral 9. A suitable power means, also not shown, is to be incorporated into the machine for driving the carriage 8 along the track with respect to the work piece 9. It is to be understood, however, that it is not intended to limit this invention to a welding machine that moves with respect to the work piece. The flux dam assembly 6, which will be described in detail hereinbelow, is adapted to be used in an embodiment wherein either one of the welding machine or work piece is movable with respect to the other.

Referring to Fig. 2, an upper carriage or support member 11 is mounted on carriage 8. A pair of horizontal guide bars 12, only a portion of one being shown, have their opposite ends anchored on carriage 11 by means of brackets 13, only one being shown. A series of brackets 14, only a portion of one being shown, are respectively fixed on the bottom of upper carriage 11 and journaled on bars 12. Upper carriage 11 is adjustable axially along bars 12 and is to be mounted in a manner permitting it to follow the contours of the work piece traced out by the cam follower or roller 16, the latter being attached to the upper carriage 11 by means of a support arm 17.

The welding head, a portion of which being indicated generally by reference numeral 18, is to be mounted on upper carriage 11 in a manner permitting it to be raised or lowered by a suitable control means, not shown. The weld rod or welding electrode 19 is supported by a nozzle portion 21 on welding head 18 together with an appropriate power means and feed mechanism, not shown, to control the rate at which the weld rod is fed out during the welding operation.

The welding electrode 19 is connected to a suitable power source so that electric fusion of the electrode metal takes place in the area of seam 26 between the work piece 9 and the adjacent end of the welding electrode. This area of seam 26 is known as the fusion zone and is normally completely submerged beneath a blanket of granular flux 27 so that the arc cannot be seen.

Referring to Figs. 1 and 2, upper carriage 11 also carries suitable flux hoppers, not shown, which supply granular flux to the fusion zone through a pair of flux spouts 23 and 24, the latter being carried on the welding head and positioned respectively on opposite sides of the welding electrode 19.

*Flux dam assembly*

Referring to Figs. 1, 2 and 4, the submerging accumulation of flux is maintained around the fusion zone by means of the flux dam assembly 6 which is mounted on holding bracket weldment 29 which is in turn affixed on support arm 17 by means of bolts 31.

Flux dam 6 includes a hinge assembly 30 which is positioned adjacent welding electrode 19. Hinge assembly 30 comprises a middle plate member 32 which has opposite lateral edges 33 and 34 that are hingeably interconnected respectively with the lateral edges 36 and 37 of wing plates 38 and 39 by means of pins 41 and 42.

Referring to Figs. 1 through 4, a channel bracket 44 is connected onto the back side of middle plate 32 by bolts 45. Flanges 47 and 48 of bracket 44 are overlapped with flanges 52 and 53 of bracket 29. Flanges 47 and 48 are slidably mounted for vertical movement on a spaced pair of guide pins 50 and 51 which pass through suitable guide bores in flange 52 and are threaded into suitable openings in flange 53. A pair of compression springs 55 and 56 are carried respectively on pins 50 and 51 and are held captive between the upper flange 52 of bracket 29 and the lower flange 48 of channel bracket 44 thereby serving as a means for biasing the hinge assembly 30 in a downward direction. The bottom edges of plates 32, 38 and 39 are coplanar in a horizontal plane and are engageable with the upper surface of work piece 9 adjacent seam 26. It will also be apparent that the hinge connections at 41 and 42 are such that the plates may be raised and lowered in a vertical direction as a unitary assembly.

Plates 32, 38 and 39 are to be constructed of a material that will not burn and are preferably made of copper. Molten flux does not adhere to copper, and its resistance to the temperature of the fusion zone is entirely satisfactory. It should be understood, however, that it is not intended to necessarily limit the invention to copper plates.

A pair of guide means 58 and 59 are carried respectively on the wing plates 38 and 39 for following the contour of the work piece during relative movement between the latter and welding machine 7. The guide means include a pair of brackets 61 and 62 which are connected respectively to the back sides of wing plates 38 and 39 as by bolts 63 and 64, best shown in Fig. 1. A pair of guide rollers 66 and 67 are mounted respectively on the end portions of brackets 61 and 62 for rotation on a vertical axis. A torsion spring 68 is carried between flanges 47 and 48 on a bolt 69 which is connected on bracket 44. Torsion spring 68 has a pair of elongated end portions 71 and 72 which bear respectively against the back side of the wing plates 38 and 39. Spring 68 is preloaded sufficiently to bias the guide rollers 66 and 67 into contact with the side of the work piece.

Referring to Figs. 1 through 4, a pusher toggle mechanism 74 is provided for selectively effecting the raising and lowering of the hinge assembly 30 into and out of engagement with the work piece. Mechanism 74 includes a support block 75 welded onto the holding bracket 29. An elongated thrust rod 76 is journaled in support 75 for axial reciprocating movement. A wedge shaped head member 77 is fixed on the end of rod 76 adjacent to bracket 44. A toggle linkage 79 is provided for controlling the axial displacement of the thrust rod 76. Linkage 79 includes a manually controlled operating lever 80 having a bifurcated end 81 pivotally connected by means of pin 87 on the end of thrust rod 76 opposite from head 77. A pair of guide links 83 and 84, shown best in Figs. 1, 2 and 3, are pivotally connected respectively at one end on opposite lateral sides of the support block 75 by means of pivot pin 86, the opposite ends of links 83 and 84 being pivotally connected to the bifurcated end 81 by means of pin 85. It will readily be apparent that pivotal movement of lever 80 about pin 85 will displace thrust rod 76 axially.

A tapered cam surface 88 of head 77 is designed to engage the under side of upper flange 47 of bracket 44 intermediate guide pins 50 and 51. As lever 80 is pivoted in a clockwise direction about pin 85, thrust rod 76 will be displaced to the left, as shown in Fig. 3, simultaneously forcing surface 88 against the upper flange 47 thereby camming or lifting the hinge assembly upwardly against the reactive force of compression springs 55 and 56. Conversely, as lever 80 is pivoted counterclockwise about pin 85, head 77 will be withdrawn from engagement with flange 47; hinge assembly 30 will be returned to the position shown in Fig. 2; and the compression force of springs 55 and 56 will urge the bottom edges of plates 32, 38 and 39 into contact with the work piece.

*Operation*

In carrying out a welding operation usually the first step is to clamp the work piece into place and pretack the members that are to be joined by welding. The operator will adjust the main carriage horizontally at the desired starting position with respect to the work piece. The upper carriage will be moved horizontally so that the cam follower 16 is brought into engagement with the side of the work piece. The welding head will then be lowered vertically to position the welding electrode in the seam to be welded, as shown in Fig. 2. Also the flux dam assembly will be properly adjusted into position by pivoting lever 80 to the left thereby lowering the hinge assembly 30 from the position shown in Fig. 3 to the position shown in Fig. 2 with the bottom edges of plates 32, 38 and 39 in contact with the surface of the work piece adjacent the seam to be welded.

After the welding machine 7 is properly positioned, the automatic welding operation is commenced. As the carriage 8 moves along work piece 9, a continuous stream of granular flux flows to the welding zone through spouts 23 and 24 and a continuous supply of welding electrode is fed into the welding zone through nozzle 21. During straight line travel of the carriage 11 along the work piece, plates 32, 38 and 39 are disposed in approximately the same vertical plane normal to the surface of the weld with the bottom edges of the plates remaining in contact with the top surface of the work piece adjacent the fusion zone. As the welding machine passes a bend in the work piece, the upper carriage will follow the contour traced out by the cam follower 16. Hinge assembly 30 will also follow the contour by means of guide rollers 66 and 67 with the wing plates 38 and 39 being angled with respect to middle plate 32, as shown in Fig. 4. Thus the flux dam is able to prevent flux from spilling over the edge of the work piece throughout the entire welding operation.

Upon completion of the welding cycle the welding machine is halted, lever 80 is pivoted to the right from the position shown in Fig. 2 to a position shown in Fig. 3 thereby lifting the hinge assembly 30 out of engagement with the work piece. Carriages 8 and 11 and welding head 18 can now be repositioned for another welding operation.

From the foregoing detailed description it will be apparent that a new and useful flux dam assembly has been illustrated which is comparatively simple in construction yet very effective in operation. Throughout the entire welding operation the hinge assembly 30 is biased vertically into contact with the upper surface of the work piece with the guide rollers being spring biased into engagement with the side of the work piece in order to follow the seam of the weld and prevent flux from being spilled over the edge of the work piece.

It is to be understood that although the one embodiment of the invention has been disclosed in detail it is not intended to limit any patent granted hereon otherwise than is necessitated by the scope of the appended claims.

What is claimed is:

1. In a submerged arc welding machine of the type wherein one of either the work piece or welding electrode is relatively movable with respect to the other, a flux dam assembly comprising: a rigid plate member having a pair of lateral edges and being connected on said welding machine for movement with and adjacent one side of the welding electrode; a pair of rigid wing plates respectively having a lateral edge hingeably connected on the lateral edges of said plate member for swinging movement about an axis parallel to said edges; guide means carried respectively on said wing plates for following the contours of the work piece during relative movement between the work piece and welding electrode; and biasing means acting against said wing plates for maintaining said guide means in contact with said work piece.

2. In a submerged arc welding machine of the type having an electrode positioned in a vertical plane above the work piece, one of either the work piece or the welding machine being relatively movable horizontally with respect to the other, a flux dam assembly comprising: a rigid plate member having a pair of lateral edges disposed in a plane normal to the surface of the work piece passing under the electrode, said plate member being connected on said welding machine for movement with and adjacent to the welding electrode; a pair of rigid wing plates respectively having a vertically disposed lateral edge hingeably connected on the lateral edges of said plate member for swinging movement about an axis parallel to said edges, the bottom edges of all of said plates being coplanar; means for biasing said plates in a downward vertical direction whereby said bottom edges are maintained in contact with the surface of the work piece adjacent the seam to be welded; guide means carried respectively on said wing plates for following the contours of the work piece during relative movement between the work piece and the welding machine; and biasing means reacting between said welding machine and said wing plates for maintaining said guide means in contact with said work piece.

3. In a submerged arc welding machine of the type having a carriage, a welding head mounted on said carriage, a welding electrode carried on said welding head, and one of either the work piece or carriage being relatively horizontally movable with respect to the other along the path of the weld, a flux dam assembly comprising: a rigid plate member mounted for vertical movement on the carriage, said plate member having a pair of lateral edges and being movable with and positioned adjacent one side of the welding electrode; a pair of rigid wing plates each having a lateral edge hingeably connected on the lateral edges of said plate member for swinging movement about a vertical axis, said wing plates being movable vertically with said plate member; guide means carried respectively on said wing plates for following the contours of the work piece during relative movement between the work piece and carriage; and biasing means reacting between said carriage and said guide means for maintaining the latter in contact with said work piece.

4. In a submerged arc welding machine of the type having a carriage, a welding head mounted on said carriage, a welding electrode carried on said welding head, one of either the work piece or carriage being relatively horizontally movable with respect to the other along the path of the weld, a flux dam assembly comprising: a rigid plate member disposed in a vertical plane adjacent the welding electrode for movement with the latter and being slidably mounted on the carriage for movement on a vertical axis, said plate member having a pair of lateral edges; a pair of rigid wing plates each having a lateral edge hingeably connected respectively on the lateral edges of said plate member for swinging movement about a vertical axis, said wing plates and said plate member being movable vertically as a unit; guide means carried respectively on said wing plates for following the contours of the work piece during relative movement between the work piece and carriage; and biasing means reacting horizontally between said carriage and said wing plates for maintaining said guide means in contact with said work piece.

5. The combination set forth in claim 4 wherein an additional biasing means reacts between the carriage and said plates for biasing the latter downwardly along said vertical axis and into contact with the work piece.

6. In a submerged arc welding machine of the type having a carriage relatively movable horizontally with respect to the work piece, a welding head mounted on the carriage, and a welding electrode carried by said welding head, a flux dam assembly comprising: a metal plate member connected on said carrier adjacent to and parallel with the welding electrode, said plate member having a pair of lateral edges extending vertically and a bottom edge extending horizontally; a pair of metal wing plates each having a vertically extending lateral edge hingeably connected on the lateral edges of said plate member for swinging movement along a vertical axis, said wing plates having bottom edges coplanar with the bottom edge of the plate member; spring means for biasing said plates in a downward vertical direction whereby said bottom edges are maintained in contact with said work piece adjacent the seam to be welded; guide means including a pair of rollers having vertical axes and carried respectively on said wing plates for following the contours of the work piece during relative movement of the carriage with respect to the work piece; and biasing means reacting between said carriage and said wing plates for maintaining said rollers in rolling contact with said work piece.

7. The combination set forth in claim 6 including a means selectively displacing said plates vertically against the biasing force of said spring means whereby said plates may be alternatively lifted out of and lowered into contact with the work piece.

8. The combination set forth in claim 6 wherein the metal of said plate member and said wing plates is copper.

References Cited in the file of this patent
UNITED STATES PATENTS

| 2,395,723 | Chmielewski | Feb. 26, 1946 |
| 2,618,727 | Osborne | Nov. 18, 1952 |
| 2,733,328 | Newbold | Jan. 31, 1956 |
| 2,763,770 | Arnold | Sept. 18, 1956 |
| 2,871,334 | Cooper | Jan. 27, 1959 |
| 2,900,487 | Danhier | Aug. 18, 1959 |
| 2,916,605 | Lucas | Dec. 8, 1959 |